United States Patent
Hattori et al.

(10) Patent No.: US 8,001,375 B2
(45) Date of Patent: Aug. 16, 2011

(54) MOBILE DEVICE, AND ACCESS CONTROL METHOD

(75) Inventors: Yasunori Hattori, Fujisawa (JP);
Hisashi Yoshinaga, Yokohama (JP);
Hiroshi Kawabata, Sapporo (JP);
Satoshi Washio, Sapporo (JP)

(73) Assignee: NTT DoCoMo, Inc., Tokyo (JP)

( * ) Notice: Subject to any disclaimer, the term of this patent is extended or adjusted under 35 U.S.C. 154(b) by 1009 days.

(21) Appl. No.: 11/570,088

(22) PCT Filed: Jun. 6, 2005

(86) PCT No.: PCT/JP2005/010367
§ 371 (c)(1),
(2), (4) Date: Dec. 6, 2006

(87) PCT Pub. No.: WO2005/121975
PCT Pub. Date: Dec. 22, 2005

(65) Prior Publication Data
US 2008/0039134 A1    Feb. 14, 2008

(30) Foreign Application Priority Data
Jun. 11, 2004    (JP) .................................. 2004-174623

(51) Int. Cl.
*H04L 29/06*    (2006.01)
(52) U.S. Cl. ........... 713/165; 713/182; 713/184; 726/27
(58) Field of Classification Search .................. 713/165, 713/182, 184; 726/27
See application file for complete search history.

(56) References Cited

U.S. PATENT DOCUMENTS

| 5,378,887 | A  | * | 1/1995 | Kobayashi | .................... 235/492 |
| 6,508,400 | B1 | * | 1/2003 | Ishifuji et al. | ................. 235/382 |
| 6,766,353 | B1 | * | 7/2004 | Lin et al. | ....................... 709/203 |

FOREIGN PATENT DOCUMENTS

| EP | 1 315 175 A2 | 5/2003 |
| JP | 62 89183 | 4/1987 |
| JP | 8 190614 | 7/1996 |
| JP | 2001 325150 | 11/2001 |
| JP | 2002 73196 | 3/2002 |
| JP | 2003 162433 | 6/2003 |
| JP | 2003 223235 | 8/2003 |
| WO | WO 99/18504 | 4/1999 |
| WO | WO 03/048926 A1 | 6/2003 |
| WO | WO 2004/034202 A2 | 4/2004 |

OTHER PUBLICATIONS

Japanese Office Action dated Dec. 7, 2010 in corresponding Japanese Application No. 2004-174623 (with English Translation).
European Office Action issued Mar. 28. 2011 in European Patent Application No. 05-751-445.7, 4 pages

* cited by examiner

*Primary Examiner* — Jason K Gee
(74) *Attorney, Agent, or Firm* — Oblon, Spivak, McClelland, Maier & Neustadt, L.L.P.

(57) ABSTRACT

A mobile device (10) has a noncontact IC (11). Three storage areas are preliminarily formed in the noncontact IC (11). When the mobile device (10) receives an application from a content server (20), a storage area (1) is assigned as a data area dedicated to this application. After that, the mobile device (10) rejects access from any application other than the foregoing application to the storage area (1).

10 Claims, 7 Drawing Sheets

| STORAGE AREA No. | APPLICATION | EXTENDED KEYS OF APPLICATION DEFINITION FILE | |
| --- | --- | --- | --- |
| | | APPLICATION PROVIDER ID | PIN |
| 1 | APPLICATION A | ID=<01> | PIN =<00123456> |
| 2 | APPLICATION B | ID=<0c> | PIN =<200536> |
| 3 | APPLICATION C | ID=<f4> | PIN =<0999000> |

MOBILE DEVICE, AND ACCESS CONTROL METHOD

TECHNICAL FIELD

The present invention relates to a technology of restricting access from an application to a data area.

BACKGROUND ART

There is the conventional technology of letting a device retain a plurality of application programs (which will be referred to hereinafter as "applications") and permitting only a specific application to make access to data. For example, Patent Document 1 described below discloses a method of applying this technology to IC cards, so as to solve the security problem and achieve effective utilization of a memory. This Patent Document 1 discloses such a technological feature that an IC card permits a plurality of applications to share a predetermined data area. The Patent Document 1 is Japanese Patent Application Laid-Open Gazette No. Heisei 8-190614.

DISCLOSURE OF THE INVENTION

Problem to be Solved by the Invention

However, the above-described conventional technology provides high degrees of freedom for access from applications, but poses the following problem of concern because it does not assume use of applications downloaded via a network. Specifically, applications acquired from the outside have different capacities of required data areas and different types of data according to their functionality and usage, and it is thus necessary to secure data areas in the IC card, for individual applications. Therefore, the IC card is forced to perform difficult operation and management of the memory, e.g., assignment or release of an area of a capacity designated by each application. An application developer is also required to develop an application so as to use only an assigned area, by designating its area numbers to make the application access only the assigned area. This raises concern that complication increases in development of applications.

An object of the present invention is therefore to facilitate management of a memory in a mobile device and to restrict applications accessing data in the memory, thereby assuring security for the data.

Means for Solving the Problem

In order to achieve the above object, a mobile device according to the present invention comprises: storing means internally having a predetermined number of data areas (e.g., three areas); acquiring means for acquiring an application; assigning means for, when the acquiring means acquires an application, assigning the application to one of the data areas in the storing means; and controlling means for performing a control to permit access from the application to the assigned data area.

An access control method according to the present invention comprises the following steps carried out by a mobile device with storing means internally having a predetermined number of data areas (e.g., three areas): an acquiring step of acquiring an application; an assigning step of, when an application is acquired in the acquiring step, assigning the application to one of the data areas in the storing means; and a controlling step of performing a control to permit access from the application to the assigned data area.

The mobile device herein is, for example, a cell phone but is not limited to this, and the mobile device may be any information equipment with a communication function such as a PDA (Personal Digital Assistance) or a PHS. It is noted that the present invention is not limited in its application by the functionality or size of information equipment.

According to these aspects of the invention, when the mobile device acquires an application, it automatically assigns the application to a data area that the application is allowed to access. Namely, on the occasion of access to data, the application uses the data area that was preliminarily secured, instead of an area designated by itself. Accordingly, the application is able to easily and quickly access the data associated with the application, without regard to the other data areas (data areas not assigned). In addition, the application acquired is permitted to make only access to the data area assigned upon acquisition, while another application is prohibited from making access to the foregoing data area. As a result, it becomes feasible to assure security for data while facilitating management of the memory (storing means), in the mobile device.

The mobile device according to the present invention may be configured as follows: on the occasion of access from the application to the data area, the controlling means acquires a PIN from an application definition file of the application to enable the access.

Access from an application to a data area requires entry of a PIN in order to secure a high security level, and, according to the present invention, the mobile device reads the PIN from the application definition file of the application and performs the access to the area by use of the PIN. This eliminates a need for a user using the application, to enter and confirm the PIN, which improves convenience.

Effect of the Invention

The present invention facilitates management of the memory in the mobile device and assures the security for data by restricting the application accessing data in the memory.

DESCRIPTION OF REFERENCE SYMBOLS 1, 2, 3 are for storage areas, 1a, 2a, 3a are for application provider ID blocks; 1b, 2b, 3b are for PIN blocks; 1c, 2c, 3c are for data blocks; 10 is for mobile device; 11 is for noncontact IC; 12 is for input part; 13 is for application receiver; 14 is for storage area assigner; 15 is for application storage part; 16 is for access controller; 20 is for content server; 30 is for external reader/writer.

Best Mode for Carrying out the Invention

Figure 1:
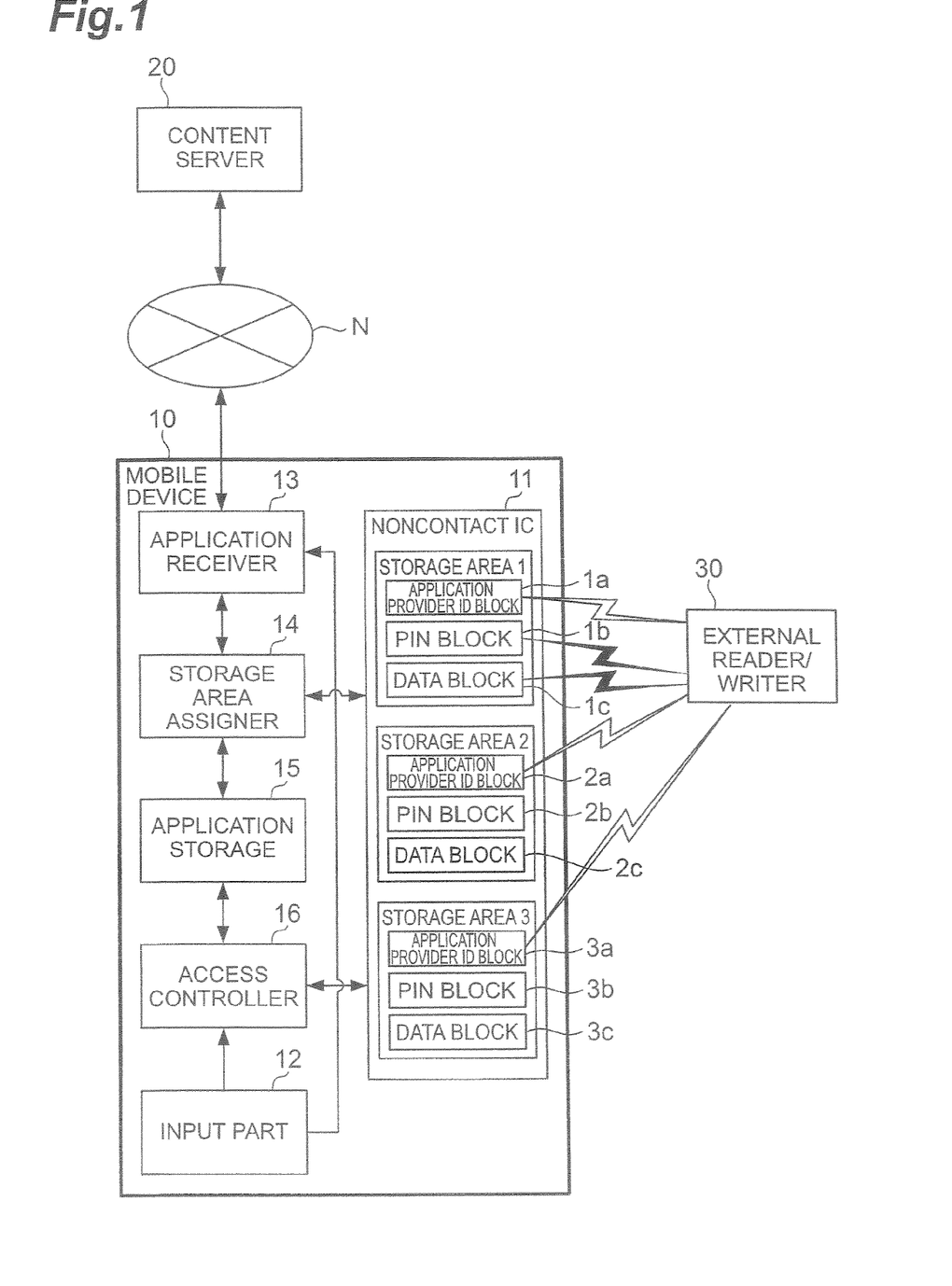
FIG. 1 is a block diagram showing a functional configuration of a mobile device according to the present invention, and schematic configuration of storage areas.

An embodiment of the present invention will be described below with reference to the accompanying drawings presented by way of illustration. First, a configuration of a mobile device 10 in the present embodiment will be described. FIG. 1 is a block diagram showing the functional configuration of the mobile device 10. As shown in FIG. 1, the mobile device 10 has noncontact IC 11 (corresponding to the storing means), input part 12, application receiver 13 (corresponding to the acquiring means), storage area assigner 14 (corresponding to the assigning means), application storage part 15, and access controller 16 (corresponding to the controlling means). These components are connected so as to be able to import and export various signals through a bus.

The detailed processing contents will be described later in description of operations, and the functionality of each component in mobile device 10 will be summarized below.

The noncontact IC 11 receives radio waves emitted from external terminals (e.g., external reader/writer 30), through a built-in antenna, to implement transmission/reception of various data. A communication method is, for example, NFC (Near Field Communication) based on the communication method of FeliCa (registered trademark). The noncontact IC 11 has three equally divided storage areas 1, 2 and 3 (corresponding to the data areas) as factory default. An application provider ID block 1a-3a, a PIN block 1b-3b, and a data block 1c-3c are formed in each of the storage areas 1-3, respectively. Identification information of a content provider, which is a provider of an application allowed to access a corresponding storage area, is stored in each application provider ID block 1a-3a. The external reader/writer 30 acquires this application provider ID from the mobile device 10 and determines whether the reader/writer itself can be an entity to provide a service. As a default value of each application provider ID, all digits are set to 0.

A PIN (Personal Identification Number) is stored as identification information to exclude unauthorized access from third parties, in each PIN block 1b-3b. When an application or external reader/writer 30 accesses a storage area, the mobile device 10 checks the PIN to restrict the access entity. A provisional PIN (e.g., "11111111") is set as a factory default.

Data stored in each data block 1c-3c differs according to contents of services provided. For example, in a case where a service implemented by an application assigned to storage area 1 is an electronic money service, remaining amount information is stored in an updatable state in the data block 1c. In a case where the service is an electronic ticket service, a type of a ticket substantializing an electronic value, or detailed information such as date and hour of event, place of event, and seat number is stored in the data block 1c. Furthermore, in a case where the service is a membership service, personal information such as a membership type, a name, and contact information can be stored in the data block 1c. The capacity of each data block 1c, 2c, or 3c is approximately 96 bytes.

Figure 2:
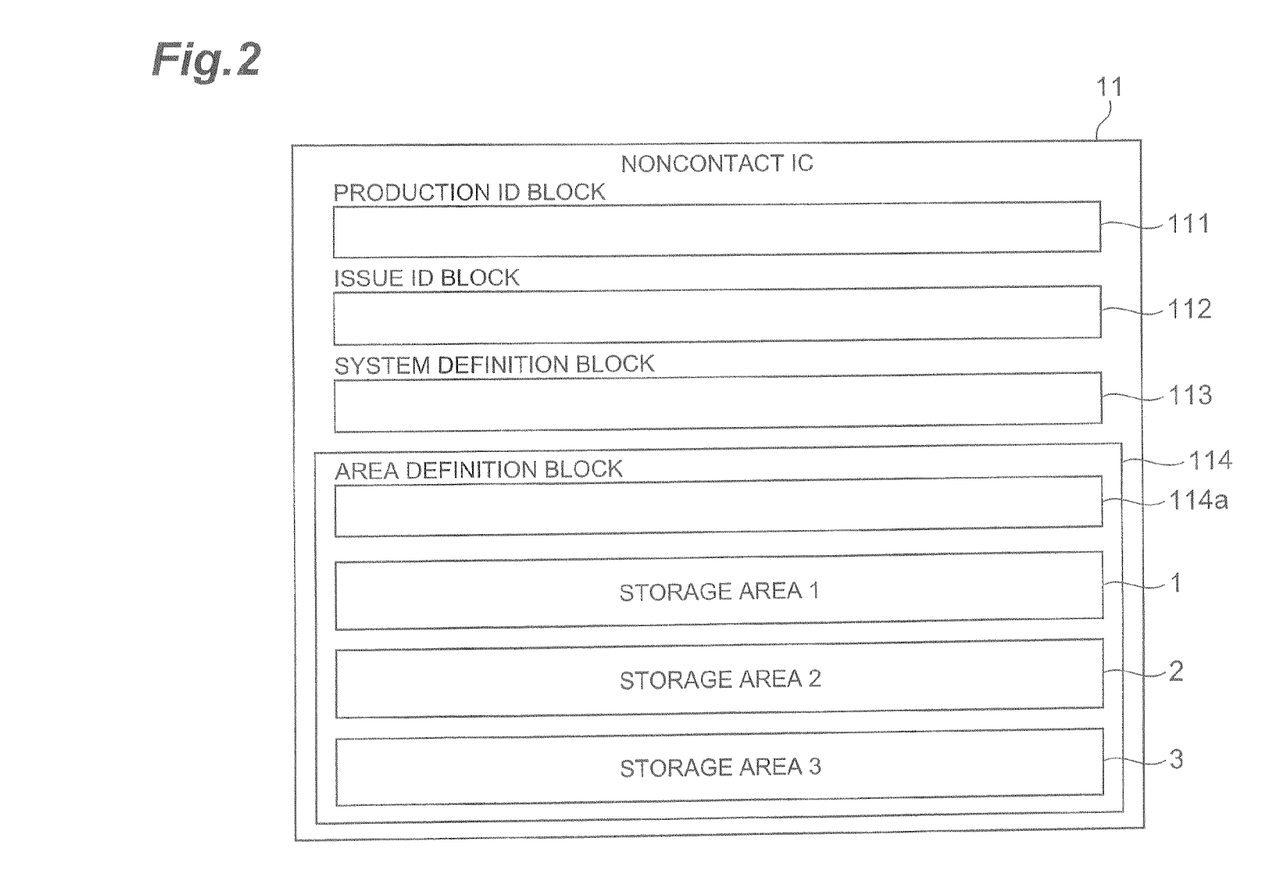
FIG. 2 is a diagram showing a data storage example in a noncontact IC.

FIG. 2 is a diagram showing the detailed configuration inside the noncontact IC 11. As shown in FIG. 2, the storage areas 1-3 are formed in predetermined regions inside area 114, in which related information of the storage areas is recorded in area definition block 114a. In addition to the storage areas 1-3, the noncontact IC 11 also has a production ID block 111 in which a production number of the IC or the like is recorded, an issue ID block 112 in which an issue number of the IC or the like is recorded, a system definition block 113 in which an operation environment of noncontact IC 11 or the like is recorded, and so on. In the system definition block 113, information such as a system code, a key version, and a system key is recorded as the operation environment of noncontact IC 11.

The input part 12 is composed of buttons as hardware, and gives instructions to execute various processes, upon detection of a user's push or touch operation. For example, the input part 12 instructs the application receiver 13 to execute a download of an application. Furthermore, the input part 12 gives an instruction to make access from an application in execution to a storage area (writing or reading of data).

When detecting the instruction from the input part 12, the application receiver 13 requests a content server 20 to transmit an application. The content server 20 retains an application A which the mobile device 10 can execute, and provides the application A in accordance with a request from the mobile device 10. On the occasion of performing a download of the application, the application receiver 13 determines whether it is to be permitted. Cases of not permitting a download include, for example, a case where an application provider ID or a PIN is not set in the application, a case where an application provider ID or a PIN is set but a format thereof does not meet a predetermined condition (the number of digits or the number of bytes), a case where the same application provider ID is already registered, a case where there is no vacant storage area, and so on.

When the application receiver 13 receives an application, the storage area assigner 14 determines a storage area as an area to which the application s assigned. The three storage areas are used in the order of storage areas 1, 2, and 3, and an application newly received in a factory default state is assigned to storage area 1. Applications received thereafter are assigned sequentially to storage areas 2 and 3. Another application can also be assigned again to a storage area released with deletion of an application. When there are a plurality of such storage areas, additional applications are assigned thereto in the priority order of storage areas 1, 2, and 3. The storage area assigner 14 is implemented by an application management mechanism (JAM: Java Application Manager).

Figure 3:
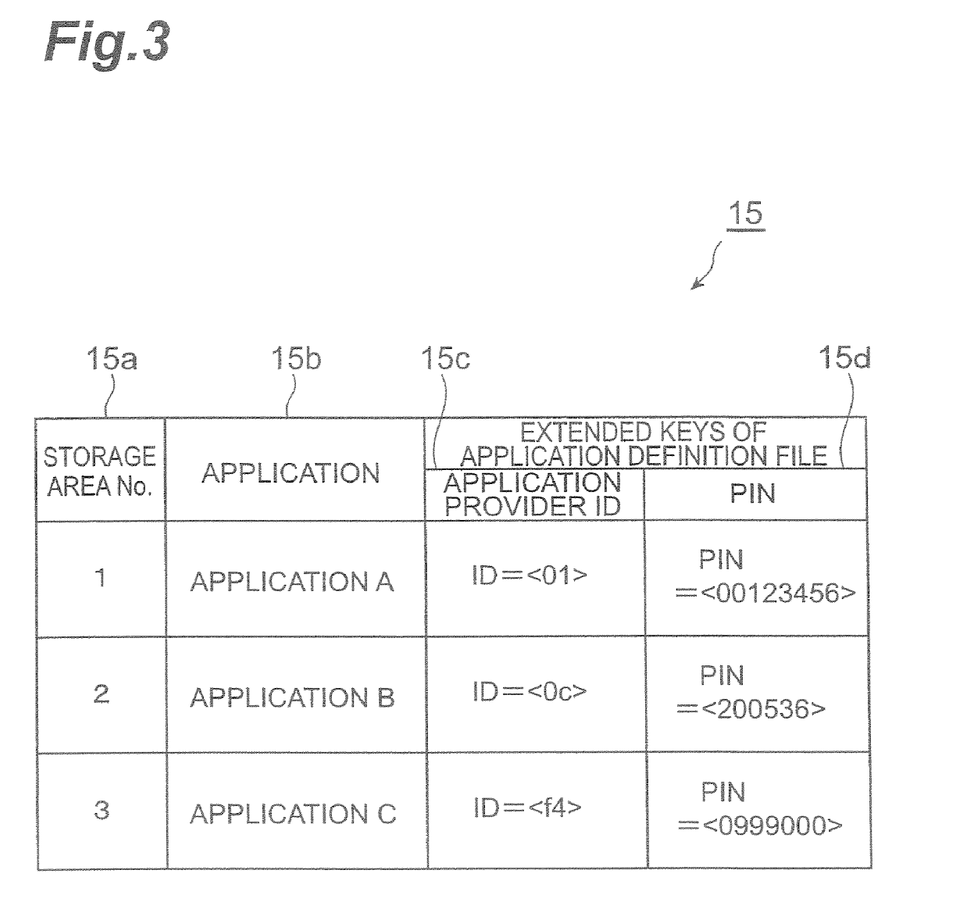
FIG. 3 is a diagram showing a data storage example in an application storage part.

The application storage part 15 is physically composed of an internal memory such as an EEPROM (Electrically Erasable and Programmable Read Only Memory). FIG. 3 is a diagram showing an example of data stored in the application storage part 15. In the application storage part 15, as shown in FIG. 3, downloaded applications are stored in correspondence to respective identification numbers of accessible storage areas. The applications are, for example, application programs of i-Appli (registered trademark). Furthermore, each application is associated with extended keys of an application definition file (ADF: Application Descriptor File) to describe its attribute information, and the aforementioned application provider ID and PIN are stored as the extended keys.

An application provider ID is designated by a character string of two digits in hexadecimal, which is put in "parameter" part in the format of ID=<parameter>. The character string can be designated using numerals of "0" to "9" and also using alphabetic letters of "a" to "f" or "A" to "F". However, when the character string designated is one except for these, or when the character string designated is of 32 digits, it corresponds to the aforementioned case where the format does not meet the predetermined condition, and thus an application with such a character string as "parameter" will never be stored in area 15b.

The same also applies to the PIN. Namely, a PIN is designated by a number of eight digits in decimal, which is put in "parameter" part in the format of PIN=<parameter>. However, "0" at the head can be omitted. A case of designating characters except for numbers corresponds to the aforementioned case where the format does not meet the predetermined condition, and thus an application with such a character string as "parameter" will never be stored in area 15b.

When the access controller 16 receives an access instruction from the input part 12, it attempts access from an application in execution to a storage area. The access controller 16 determines whether access is to be permitted, according to whether the application in the access attempt is assigned to a storage area to be accessed. For example, in a case where application A is assigned to storage area 1, the access controller 16 permits only application A to make access from the application to the storage area 1, and rejects access from other applications to the storage area 1. The access controller 16 acquires a PIN (PIN=<00123456>) from an application definition file of application A and checks it against the PIN stored in the PIN block 1b of the storage area 1. When they agree, the access is permitted.

Figure 4:
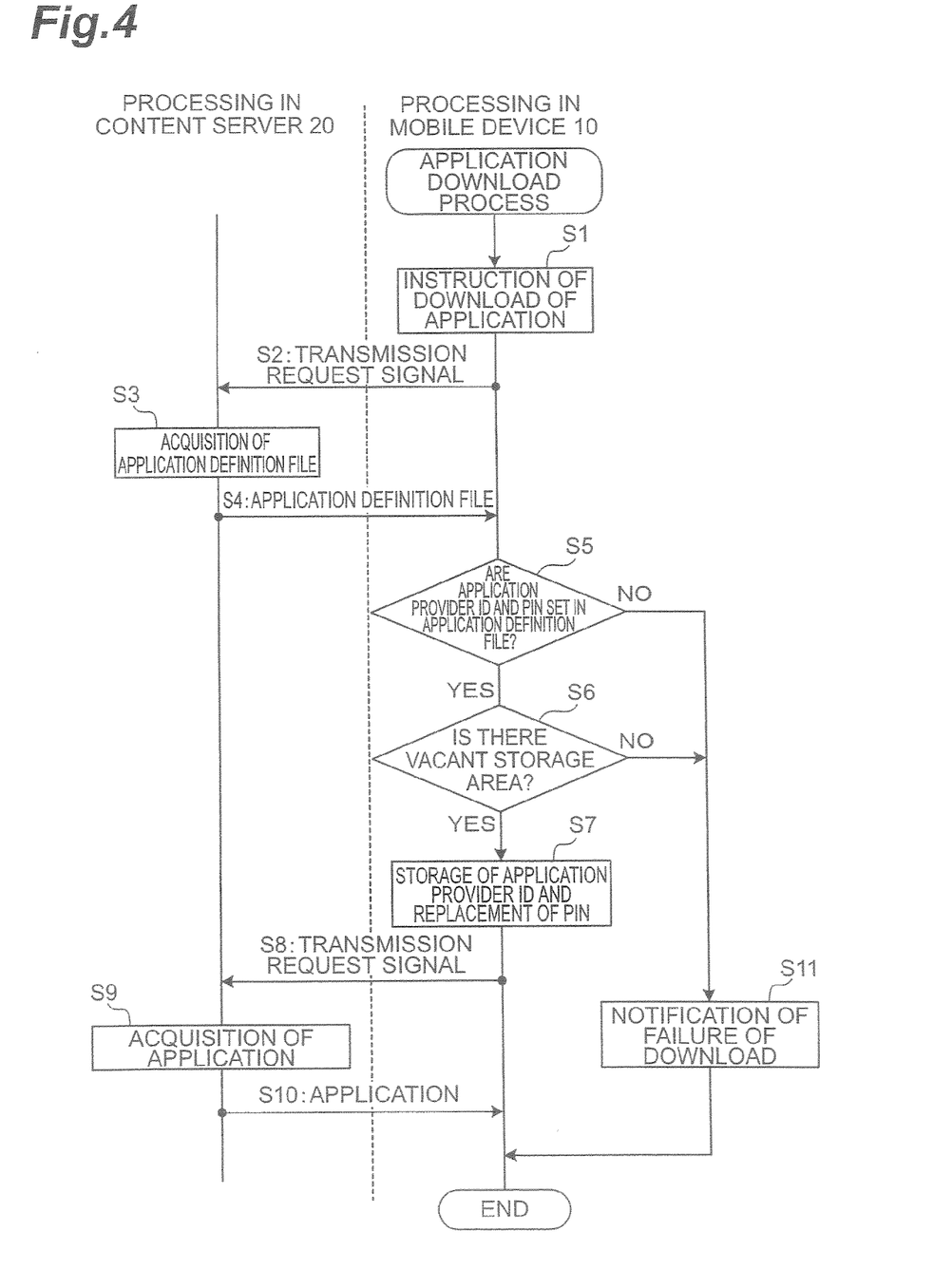
FIG. 4 is a flowchart for explaining a process where a mobile device downloads an application from a content server.

Next, the operation of the mobile device 10 will be described, with an access control method according to the present invention. It should be noted as a premise of description that the present invention is applicable to all situations of requesting acquisition of any one of applications A, B, and C, and the present embodiment is based on the assumption of a situation in which the mobile device 10 downloads application A from content server 20, for convenience' sake of description. FIG. 4 is a flowchart for explaining an application download process.

When a download of an application is ordered through the input part 12 (S1), the mobile device 10 makes the application receiver 13 transmit a transmission request signal to content server 20 (S2). The content server 20 is managed and operated by a content provider which provides a service by use of application A and external reader/writer 30. When the content server 20 receives the foregoing transmission request signal, it acquires the application definition file of the application (S3) prior to transmission of application A, and then transmits the application via network N to the mobile device 10 (S4).

At S5, the mobile device 10 makes the storage area assigner 14 examine the received application definition file. Namely, the storage area assigner 14 determines whether the application provider ID and PIN both are set in their respective regular formats in the application definition file. When they are set in the regular formats (S5; YES), processing of S6 and subsequent steps will be executed. At S6, the storage area assigner 14 checks whether there is a vacant storage area. When there is an unused storage area (S6; YES), the storage area assigner 14 determines that the application can be assigned to a storage area, stores the application provider ID in the application definition file into the application provider ID block, and replaces the provisional PIN in the PIN block with the PIN in the application definition file (S7). This completes assignment of the application to the storage area.

For example, assuming that the mobile device 10 is in a factory default state, the storage areas 1-3 all are unused and an area to be assigned to the application A to be received is determined to be storage area 1. At S7, therefore, the application provider ID "ID<01>" in the application definition file of the application A is stored into the application provider ID block 1a, and thereafter the PIN "PIN=<00123456>" is stored as overwritten into the PIN block 1b.

After completion of the assignment, the download of application A is started. First, the mobile device 10 transmits a transmission request signal to the content server 20 (S8). Next, the content server receiving the request signal acquires the application A (S9) and transmits it to the mobile device 10 (S10).

On the other hand, when the result of the determination at S5 is that the application provider ID and PIN both are not set in their respective regular formats in the application definition file (S5; NO), the download is aborted to terminate the sequential application download process. Desirably, the mobile device 10 notifies the user of the failure of the download with the reason for it (S11). The above case includes a case where no application provider ID is set, a case where no PIN is set, and a case where the same application provider ID is already present in the application provider ID block of any other storage area. The process of S11 is also executed when the result of the check at S6 is that there is no unused storage area (S6; NO).

A message to indicate the failure of the download can be, for example, a display of "The download was unsuccessful because of no PIN set in the application definition file", or a display of "The download was unsuccessful because of no vacant storage area".

Figure 5:
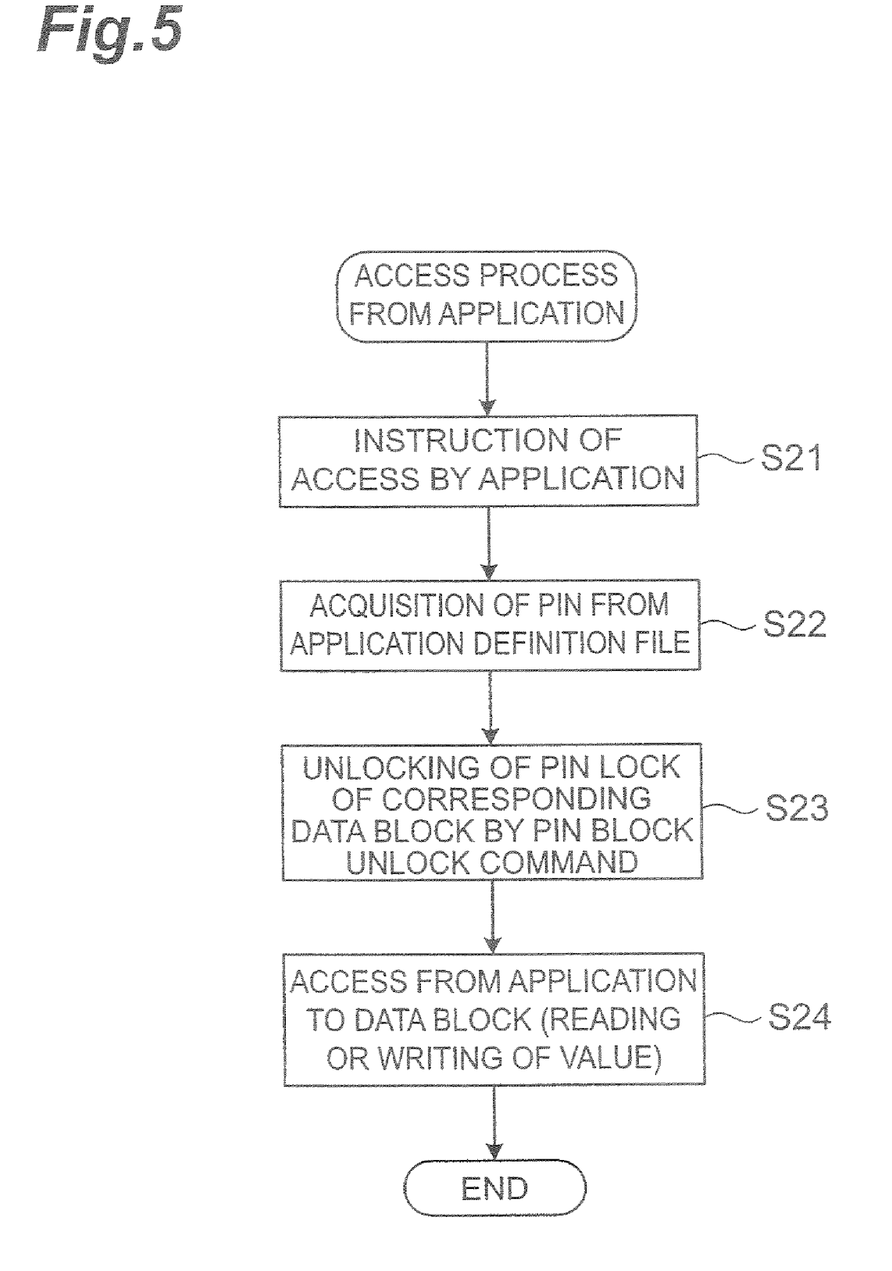
FIG. 5 s a flowchart for explaining a process where an application in a mobile device accesses a storage area.

Subsequently, a process in which application A accesses storage area 1 will be described with reference to the flowchart of FIG. 5.

At the first step S21, an access instruction is given to make access from the application A stored in the application storage part 15, to storage area 1. This access instruction may be automatically given as triggered by a start of application A, or may be given in response to a user's command. The start as a trigger of the access instruction may be an automatic start with a trigger of detection of the external reader/writer 30, or may be a manual start by a user's command of the mobile device 10.

With the access instruction to storage area 1, the access controller 16 of the mobile device 10 calls up an API (Application Program Interface) for application A to access data block 1c, and acquires the PIN from the application storage part 15. This results in acquiring the PIN "PIN=<00123456>" to unlock the PIN block 1b, from the application definition file of application A (S22).

Subsequently, the access controller 16 uses the application management mechanism to issue a PIN block unlock command from the foregoing PIN, and unlocks the PIN lock of the data block 1c (S23). This unlocking process permits access from application A to data block 1c, and the access controller 16 reads or writes a value out of or into the data block 1c (S24). Since the sequential processing necessary for the unlocking of the PIN lock is completed as internal processing of the mobile device 10 as described above, there is no need for the user to enter and confirm the PIN key.

Figure 6:
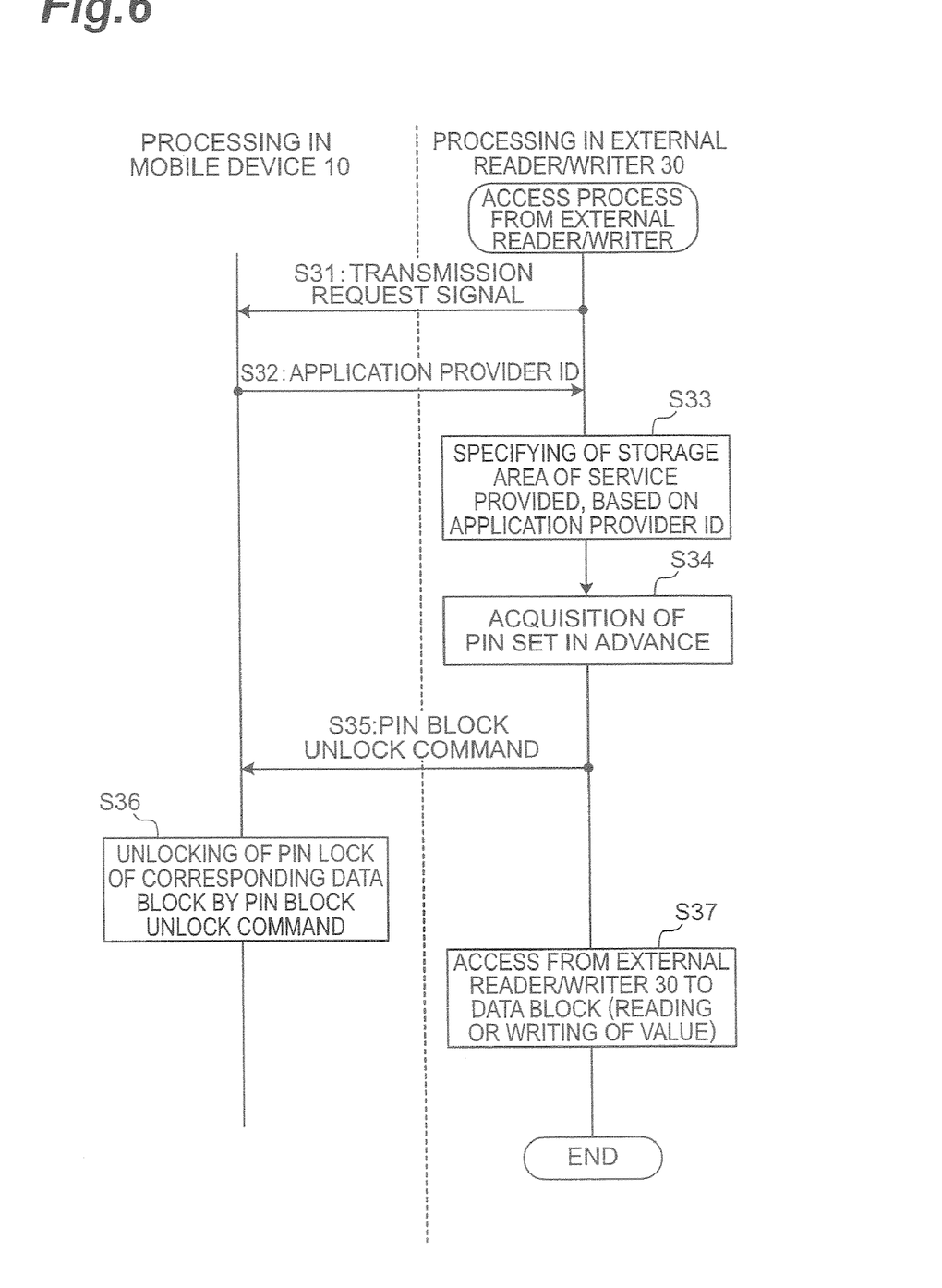
FIG. 6 is a flowchart for explaining a process where an external reader/writer accesses a storage area.

Next, a process for external reader/writer 30 to access storage area 1 will be described with reference to the flowchart of FIG. 6.

The external reader/writer 30 constantly sends out a signal to request transmission of an application provider ID in each storage area, to an unspecified number of mobile devices polling) (S31). The mobile device 10, receiving the request signal, returns the application provider ID "ID=<01>" presently retained in the noncontact IC 11, to the external reader/writer 30 (S32).

The application provider ID contains a record of information to identify an accessible storage area of a corresponding application (application A in the present embodiment). Therefore, the external reader/writer 30 is able to specify the storage area used upon provision of a service, with reference to the received application provider ID (S33). At this point of time, the storage area is specified as storage area 1. The external reader/writer 30 retains the PIN dedicated to the user of the mobile device 10, which was preliminarily set by the service provider (at the time of definition of the application definition file). The external reader/writer 30 acquires it in order to unlock the PIN block (S34).

At S35, the external reader/writer 30 uses the PIN acquired at S34, to issue a PIN block unlock command of the storage area 1 specified at S33, and transmits it to the mobile device 10. The mobile device 10 receives the PIN block unlock command, and checks the PIN of this command against the PIN stored in the PIN block 1*b* of storage area 1. When the two PINs agree, the PIN lock of the data block 1*c* in the storage area 1 is unlocked (S36). This results in permitting access from the external reader/writer 30 to data block 1*c*. Thereafter, the external reader/writer 30 performs access to read or write a value out of or into data block 1*c* (S37). As described above, the sequential processing necessary for the unlocking of the PIN lock is completed through collaboration between the mobile device 10 and the external reader/writer 30. Namely, there is no need for the user to enter and confirm the PIN on the external reader/writer 30 side.

Figure 7:
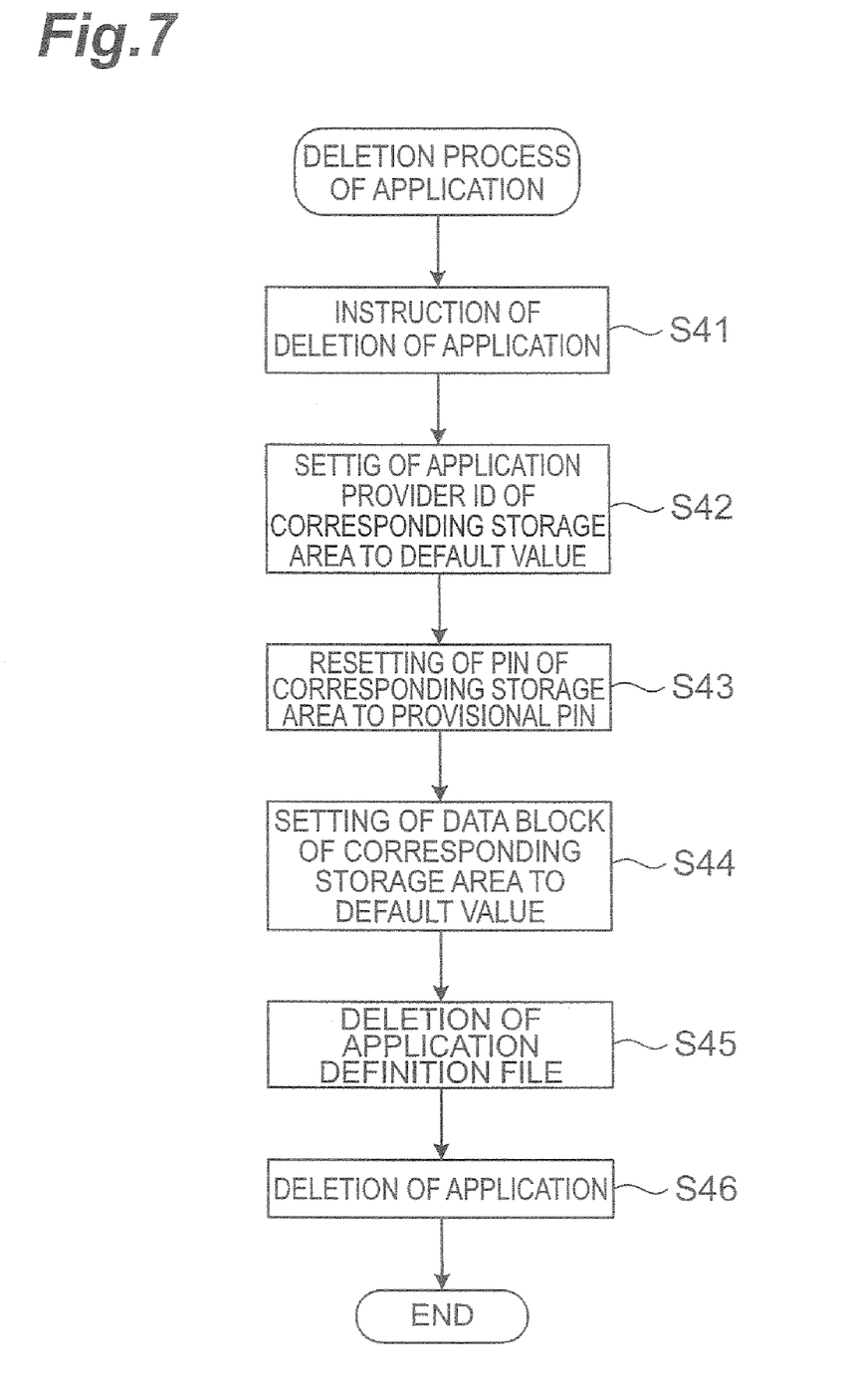
FIG. 7 is a flowchart for explaining a process where a mobile device deletes an application.

Next, a process of deleting application A no longer necessary, from the mobile device 10 will be described with reference to the flowchart of FIG. 7.

When an instruction to delete application A is entered through the input part 12 (S41), the access controller 16 uses the application management mechanism to return the application provider ID set in the application provider ID block 1*a* of storage area 1, to the default value (S42). This changes the "ID=<01>" set in the application provider ID block 1*a*, to "ID=<00>". Concerning the PIN, the access controller 16 also again sets the provisional PIN in a similar fashion (S43). As a result, the "PIN=<00123456>" set in the PIN block 1*b* is changed to the default value "PIN=<11111111>".

Furthermore, the access controller 16 returns the data block 1*c* in the storage area 1 of application A under the instruction to delete it, to the default value (S44). This results in deleting the value stored in the data block 1*c* (the remaining amount of electronic money or electronic coupon). Subsequently, the access controller 16 executes deletion of the application definition file stored in the application storage part 15 (S45), and deletion of application A (S46). The execution of the application deletion process results in yielding the storage area for the application once downloaded, to another application, which improves the efficiency of utilization of noncontact IC 11.

In the mobile device 10 in the present embodiment, as described above, the three storage areas are preliminarily secured in the built-in noncontact IC 11 and, on the occasion of performing a download of the application A, one of them, storage area 1, is assigned. At this time, a PIN for excluding access from unauthorized third parties is set in the storage area 1, and thereafter, the authentication process with this PIN is necessary for access to the storage area 1. The PIN-retaining entities are limited to the application definition file of application A and the external reader/writer 30 to provide the service using the application A. Therefore, the mobile device rejects access from any means other than these (e.g., applications B, C and other external equipment), which maintains the confidentiality of data in the storage area 1. It also prevents unauthorized use of the data.

The assignment of the application to the storage area is performed by the mobile device 10 upon the download. For this reason, there is no need for the application side to preliminarily designate a data area to be accessed, and there is no need for the mobile device 10 to determine the propriety of securing a data area, based on the information, and to form a data area, either. Therefore, it becomes easier to perform management of noncontact IC 11. There is also the following effect for application developers: they can provide services for a mobile device making use of the noncontact IC, without need for registering a developed application with an operation management mechanism or for preparing a server for noncontact IC requiring a large investment. Services available for the mobile device can be, for example, a coupon service, a point service, an admission service, and so on. Other potential applications include events and attractions such as lotteries, employee ID cards, membership cards, and so on.

For example, in the case of the coupon service, the mobile device 10 first accesses a Web site through an application to download an electronic coupon. The electronic coupon downloaded is stored into a data block in the noncontact IC 11, assigned to the application. On the occasion of using the coupon, the external reader/writer 30 reads the electronic coupon and provides a predetermined service.

In the case of the point service, the external reader/writer 30 adds a point to a point held in the data block of noncontact IC 11 on the occasion of purchasing a commodity. A cumulative state of points can be checked on an as-needed basis by an application (viewer). After arrival at a predetermined point, the mobile device 10 accesses the point through the application and notifies the external reader/writer 30 or files it with an unrepresented server device. This enables the user of the mobile device 10 to receive a service according to the point.

In the case of the admission service, the mobile device 10 uses an application to connect to a server device and downloads an electronic ticket. The electronic ticket is stored into a data block of noncontact IC 11. When the user enters a gate, the external reader/writer 30 installed at the gate reads the contents of the electronic ticket and determines whether the entry is admitted. If the electronic ticket is valid, the entry of the user of the mobile device 10 is permitted.

The present invention is not limited to the above-described embodiment, and can be substantialized in a variety of modification forms, without departing from the spirit and scope thereof.

For example, the above embodiment exemplified NFC as short-range wireless communication between the mobile device 10 and the external reader/writer 30. It is, however, a matter of course that the present invention is also applicable to infrared communication including Bluetooth (registered trademark) or IrDA (Infrared Data Association) and to wireless LAN (Local Area Network) communication.

INDUSTRIAL APPLICABILITY

The present invention is applicable to the mobile device with the function of restricting access from an application to a data area and to the access control method thereof, and facilitates management of the memory while assuring the security for data.

The invention claimed is:

1. A mobile device comprising:
storing means internally having a predetermined number of data areas;
acquiring means for acquiring an application;
assigning means for, when the acquiring means acquires an application, assigning the application to one of the predetermined number of data areas in the storing means;
application storing means for storing the application acquired by the acquiring means and a personal identification number (PIN) corresponding to the application in association with an identifier representing the data area assigned for the application by the assigning means; and controlling means for performing a control to permit access from the application to said assigned data area by acquiring the PIN corresponding to the application from the application storing means and unlocking a PIN lock of the data area to be accessed using the acquired PIN, and wherein, on the occasion of performing control to permit access from the application to said assigned data area, the controlling means acquires the PIN from an application definition file corresponding to the application.

2. The mobile device according to claim 1, wherein the application definition file is an Application Descriptor File.

3. An access control method carried out by a mobile device with a memory having a predetermined number of data areas, the method comprising:

acquiring an application;

assigning the application to one of the predetermined number of data areas in the memory;

storing the application and a personal identification number (PIN) corresponding to the application in an application memory in association with an identifier representing the data area assigned to the application; and performing control to permit access from the application to said assigned data area by acquiring the PIN corresponding to the application from the application memory and unlocking a PIN lock of the data area to be accessed using the acquired PIN, and and unlocking a PIN lock of the data area to be accessed using the acquired PINT, and wherein, on the occasion of performing control to permit access from the application to said assigned data area, acquiring the PIN from an application definition file corresponding to the application.

4. A mobile device comprising:

a first memory having a predetermined number of data areas;

a communication interface configured to acquire an application;

a processor configured to assign the application to one of the predetermined number of data areas in the first memory when the communication interface acquires the application;

a second memory configured to store the application and a personal identification number (PIN) corresponding to the application in association with an identifier representing the data assigned to the application by the processor; and a controller configured to permit access from the application to said assigned data area in the first memory by acquiring the PIN corresponding to the application from the second memory and unlocking a PIN lock of the data area to be accessed using the acquired PIN, and wherein, on the occasion of performing control to permit access from the application to said assigned data area, the controller acquires the PIN from an application definition file corresponding to the application.

5. The mobile device according to claim 4, wherein the processor is configured to determine whether the application has been acquired by the communication interface by determining whether the PIN corresponding to the application has been received.

6. The mobile device according to claim 4, wherein the second memory is further configured to store an application provider ID identifying a provider of the application.

7. The mobile device according to claim 6, wherein the processor is configured to determine whether the application has been acquired by the communication interface by determining whether the application provider ID attached to the application has been received.

8. The mobile device according to claim 6, wherein the data area assigned for the application is configured to be accessed by equipment external to the mobile device, the data area is configured to store the application provider ID identifying a provider of the application, and the equipment is configured to determine whether it is capable of accessing the data area based on the application provider ID stored in the data area assigned for the application.

9. The mobile device according to claim 4, wherein the PIN corresponding to the application is acquired from an application definition file corresponding to the application.

10. The mobile device according to claim 4, wherein the data area assigned for the application is configured to be accessed by equipment external to the mobile device, the equipment retains a PIN corresponding to the application, and the equipment is configured to unlock the PIN lock of the data area using the retained PIN to permit access from the application to the assigned data area in the first memory.

* * * * *